United States Patent [19]

Meaney, Jr.

[11] 4,060,319

[45] Nov. 29, 1977

[54] COHERENT BEAM IMAGING APPARATUS AND METHOD

[76] Inventor: Daniel J. Meaney, Jr., 574 Calle Anzuelo, Santa Barbara, Calif. 93111

[21] Appl. No.: 588,668

[22] Filed: June 20, 1975

[51] Int. Cl.² .......................................... G03G 15/24
[52] U.S. Cl. .................................. 355/3 DD; 96/1.3; 346/108; 358/300
[58] Field of Search ............... 355/3 R, 3 DD, 3 FU, 355/8, 17; 250/199; 331/94.5 S, 94.5 K, 94.5 M; 346/108; 358/300; 96/1 R, 1 SD, 1.3

[56] References Cited

U.S. PATENT DOCUMENTS

| | | | |
|---|---|---|---|
| 3,465,347 | 9/1969 | Hudson | 250/199 |
| 3,597,536 | 8/1971 | Fowler | 250/199 |
| 3,659,936 | 5/1972 | Klose et al. | 355/3 R |
| 3,660,818 | 5/1972 | Amodei et al. | 355/3 R |
| 3,662,100 | 5/1972 | Hollingsworth | 250/199 |

Primary Examiner—L. T. Hix
Assistant Examiner—J. A. LaBarre

[57] ABSTRACT

An imaging apparatus including a means for converting graphic indicia into an electrical representations, a source of a coherent beam of optical radiation at a predetermined wavelength, a modulator for controlling the transmissive characteristics of a crystal which modulates the coherent beam in response to the electrical representations, a light deflector for scanning the modulated coherent beam in a scan pattern forming an image on a surface and means for developing the image from the surface and imaging a representation of graphic indicia by controlling the modulation and scanning of a coherent beam of optical radiation in a controlled pattern forming an image on a surface representative of the graphic indicia and developing the image.

14 Claims, 3 Drawing Figures

COHERENT BEAM IMAGING APPARATUS AND METHOD

BACKGROUND OF THE INVENTION

1. Field of the Invention

This invention relates to imaging apparatus and method and more particulrly to imaging apparatus utilizing a coherent beam of optical radiation which is modulated and scanned to produce in a pattern, an image capable of being developed by any one of several methods.

2. Description of the Prior Art

In conventional copying or reproducing apparatus, optical means are utilized to produce on optical image of graphic indicia. The optical image may be focused on the surface of a selenium drum in an electrostatic copier producing an electrostatic image from the optical image. The electrostatic image is developed using a developing powder such as, for example, a black, thermally settable ferromagnetic oxide powder.

Other known copying or reproducing apparatus utilize means for focusing an optical image of graphic indicia onto the surface of a chemically treated copy sheet. The image sheet may be developed thermally by a high intensity heat source or with a thermally settable powder which is bonded onto the surface of the treated copy paper.

One problem inherent in such apparatus is that a large lens or optics system is required to directly focus an optical image of the graphic indicia onto a surface. A mechanical scanning means is normally required. In certain applications, the optical image is mechanically scanned in sequence onto a surface to form a developable image. In other applications, a light source is scanned across the indicia to form a developable image.

It is, therefore, an object of this invention to provide an apparatus for imaging a representation of graphic indicia using a modulated, scanned coherent beam of optical radiation to form a developable image on a surface.

It is another object of this invention to provide apparatus and method for utilizing a modulated, scanning coherent beam of optical radiation to concurrently form an image and develop the same.

It is a further object of this invention to provide apparatus and method for utilizing a modulated, scanning coherent beam of optical radiation that forms an image which can sequentially be developed.

It is yet another object of this invention to provide apparatus and method for utilizing a photochromatic member to module a scanned coherent beam of coherent radiation in combination with light deflecting means to form an electrostatic image developable with known ferromagnetic oxide powder developing techniques.

SUMMARY OF THE INVENTION

These and other objects of the invention are accomplished in accordance with one embodiment of the invention in which an optical image of graphic indicia is converted into a electrical representation thereof, a coherent beam of optical radiation, having a wavelength within a particular wavelength range, is modulated and scanned onto a surface in response to signals derived from the electrical representation to produce a developable image on the surface and the so formed image is developed using any one of many known techniques.

In another embodiment, the modulated scanning coherent beam of optical radiation forms an image on a surface containing a relatively thin film of thermally settable and bondable developing fluid and, concurrently, with forming the image, the coherent beam radiation level is controlled at an energy level cable of thermally setting and bonding the developing fluid as the modulated electron beam is scanned in a controlled pattern on the surface.

In yet another embodiment, the coherent beam of optical radiation is scanned onto a photochromatic glass to modulate the beam, deflected by a beam splitter, onto an electrostatic image forming means and the electrostatic image form by the modulated scanned coherent beam is developed using known ferromagnetic oxide powder developing techniques.

In each of the embodiments, the coherent beam of optical radiation is modulated and scanned in a controlled pattern to form a developable image. In certain embodiments the controlled beam is utilized to concurrently form and develop the image, while in other embodiments the formed image is developed after imaging using known techniques.

The apparatus and method of this invention utilize lasers and masers as means for producing a developable image on a surface in the order of microseconds compared with longer imaging tims of the known prior art. Copies or reproductions of graphic indicias can be reproduced at high rates of speed, limited solely by the rate at which a strip media can be transported across the laser beam imaging station.

This invention has utility in the copy, reproducing and printing field. If desired, the optical image to electrical represention converting means may be either part of an integrated copying apparatus or be a separate component which may be remotely located from the developing apparatus. Such a system would have utility as a facsimile transmission system.

BRIEF DESCRIPTION OF THE DRAWING

These and other objects of the invention, together with its various features and advantages, can be more easily understood from the following more detailed description taken in conjunction with the accompanying drawing in which.

DESCRIPTION OF THE PREFERRED EMBODIMENT(S)

Although means for generating coherent beams of electromagnetic radiation at various energy levels and frequencies are known it will be helpful to review the types of sources generally known in the art. The coherent beam of optical radiation, which includes masers or lasers, produce coherent electromagnetic radiation at various energy levels and at particular wavelengths within a range of wavelengths. The coherent electromagnetic radiation can be generated and amplified over a wide frequency range which extends from the far infrared region of the spectrum, through the visible region and through the ultraviolet region.

Generally a maser is a high Q device, has a relatively high output power compared to a laser and the maser output power is sensitive to small changes in resonator losses. One example of such a maser is a tube which functions as a housing for a direct current (D.C.) excited plasma column as the active maser material with the cavity formed by a pair of spaced mirrors. One example of such material is a helium-neon gas mixture. The selected maser material, determines the frequency of the coherent electromagnetic radiation. In addition, other than D.C. pumping means for producing a population inversion in the maser material are known in the art and may be utilized in practicing the teachings of this invention.

Laser generally includes an injection semiconductor laser. The semiconductor laser, generally comprises a solid state device formed of a P material and N material. Each material has one surface which forms a common P.N.-junction between the material and a parallel opposite surface which has electrodes affixed thereto. A resonant cavity is formed by opposite parallel surfaces which may be either spaced mirrors or cleaved surfaces which generally are perpendicuar to the P-N laser junction. Application of a voltage across the electrode in proper polarity injects a current flow through the device causing generation of electromagnetic radiation at the junction. The resonant cavity establishes a standing wave pattern of electromagnetic radiation resulting in emission of coherent electromagnetic radiation from the cavity at a particular frequency (if monochromatic) or frequencies (if polychromatic). If the resonant cavity is formed by cleaved surfaces, generally one of the surfaces is partially silvered to cause the coherent electromagnetic radiation to be emitted from the unsilvered surface. One example of such P-N junction laser a Gallum-arsenide (GaAs) Laser. It is anticipated that the energy of the laser beam so emitted is at a predetermined minimum energy level and sufficient to image a predetermined treated surface.

Figure 1:
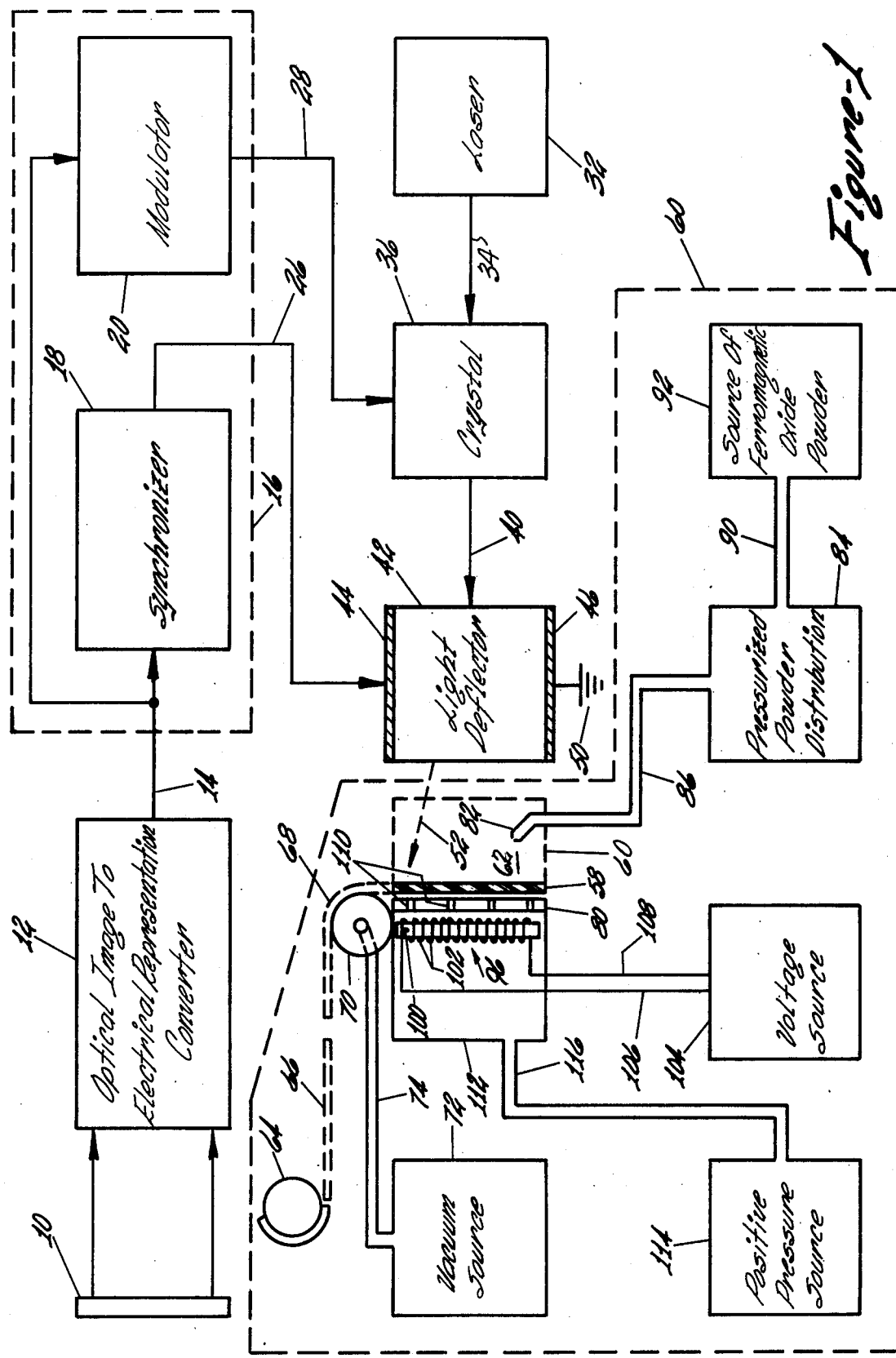
FIG. 1 is a Block diagram, partially in schematic representation, of one embodiment of apparatus and method for imaging a representation of a graphic indicia wherein a modulated scanned coherent beam of optical radiation concurrently forms an image and develops the formed image using a black ferromagnetic oxide developing powder.

Referring now to FIG. 1, a graphic indicia generally designated as 10, is positional to be imaged by an optical image to electrical representation converter generally denoted 12. The graphic indicia 10 may be a document, such as a letter, which is to be copied or reproduced. The converter 12 may be any known means for converting graphic indicia to an electrical representation thereof, such as for example a video camera. One such known device which converts an optical image (which may be graphic indicia) to an electrical representation, is described in U.S. Pat. No. 3,716,747. The term "graphic indicia" is intended to be as broad as possible and includes any image, whether optical, visual or otherwise which can be converted into electrical representation thereof. For example, it is possible to convert a visual image of a scene into an electrical signal by use of a video camera. The visual image could likewise be a printed document. Although this invention has utility as a copying or reproducing apparatus for printed material, it is invisioned that any type of image capable of being converted into electrical signals may be reproduced by practicing this invention.

The electrical representation generated by converter 12 appear at an output represented by lead 14 as an electrical signal containing predetermined synchronizing and modulation information. The electrical signal represented by lead 14 is applied to a control means generally represented by dashed rectangle 16. In the embodiment of FIG. 1, the control means 16 including a means for generating a synchronzing control signal 18 (generally referred to as synchronizer 18) and a means for generating a modulating control signal 20 (hereinafter referred to as modulator 20). The electrical signal represented by lead 14 is the input to both the synchronizer 18 and the Modulator 20.

Synchronizer 18 is responsive to the electrical representations of the signals represented by lead 14 to produce a synchronizing control signal which is represented as an output signal by lead 26. Similarly, modulator 20 is responsive to the signal represented by lead 14 to produce a modulating control signal which is represented as an output signal by lead 28. In summary, the control means 16 is operatively coupled to the converting means 12 and is responsive to the electrical representation therefrom to general a scanning control signal and a modulating control signal.

A source of a coherent beam of optical radiation having a wavelength within a particular wavelength range (hereinafter generally referred to a laser) 32 produces an output beam represented by lead 34. The output beam is directed onto a laser beam modulator 36 which selectively modulates the energy level or intensity of the coherent beam in response to modulating control signal represented by lead 28, which are applied to the laser beam modulator 36 from the modulator 20 of control means 16. Laser Beam modulators are well known in the art. Of importance is that the modulator material have a absorption coefficient within the particular wavelength of the coherent beam to transmit the coherent beam without significantly attenuating the coherent beam. The absorption coefficient may be selectively varied in response to a modulating control signal to vary the transmissive characteristics of the material which in turn modulates the coherent beam. Also, the optical density of the material may be varied by other known methods, the result of which is to modulate its intensity of the coherent beam.

The modulated coherent beam, generally designated by lead 40, is scanned by a light deflector 42. Light deflector 42 controllably scans the modulated coherent beam in a scan pattern in response to the scanning control signals, represented by lead 26, which are applied to the light deflector 42 from the synchronizer 18 from the control means 16.

Light deflector 42 may be any known means for scanning a coherent beam in a scan pattern. One example of such a deflector is an electro-optic crystal as shown in FIG. 1. Typically this electro-optical crystal has a pair of spaced parallel longitudinal surfaces are provided with electrodes 44 and 46. Synchronizer 18 is connected to one electrode 44 and the other electrode 46 is connected to common ground 50. Synchronizer 18 applies synchronizing control signals across electrodes 44 and 46 to create an electric field to modulate the index of refraction of light crystal material. In this manner, the modulated coherent beam is scanned in a scan pattern determined by the synchronizing control signals.

In FIG. 1, the scanned modulated coherent beam which is the output of light deflector 42 is generally represented by dashed line 52. The scanned modulated coherent beam is scanned so as to form an image on a surface, such as for example, the surface of a strip material 58. The strip material may be a strip of paper which is to form a reproduced copy of graphic indicia 10. The means for developing the image formed in the surface may be accomplished using any one of several apparatus and methods. The means for developing the image in the embodiment of FIG. 1 is generally enclosed by dashed area 60. Other means for developing the image are discussed in connection with FIGS. 2 and 3.

The means for developing the image 60 of FIG. 1 includes on enclosed developing area 62. Developing area 62 is positioned relative to the light deflector 42 to receive the scanned modulated coherent beam 52. The strip material 58 is removed from a roll of stock strip material 64 cut and transported by known cutting means and paper transporting means (not shown) is illustrated by separate pieces of strip material 66 and 68.

The strip material segments are transported to a vacuum capstan 70 which is connected to a controlled vacuum source 72 via conduit 74. Vacuum capstan 70 establishes a negative pressure on the surface of the strip member in communication therewith holding the strip material thereagainst. Then, the vacuum capstan transports the strip material along a predetermined path into the develop area 62. The strip material is ultimately positioned onto the surface of a plenum plate 80 which is positioned generally perpendicular to the scanning modulated beam 52. Plenum plate 80 forms one side of the developing area 62.

The developing area 62 includes an orifice 82 which is positioned relative to strip material 58. Orifice 82 is broadly a means for distributing a relatively thin film of thermally settable and bondable developing fluid on the surface of strip material 58. The orifice 82 is connected by a conduit to a pressurized powder distributor 84 via a conduit 86. Distributor 84 is connected via a conduct 90 to a source of powder 92 such as ferromagnetic oxide powder used in electrostatic copiers for developing images.

The ferromagnetic oxide powder is one example of a thermally settable and bondable developing fluid. Of importance is that the fluid is capable of being selectively thermally set and bonded within a predetermined temperature range. In FIG. 1, a thin film of ferromagnetic oxide powder is substantially uniformly distributed across the surface of the strip material 58. The result is that the scanning modulated coherent beam scans the image onto the coated surface of strip material 58.

Figure 2:
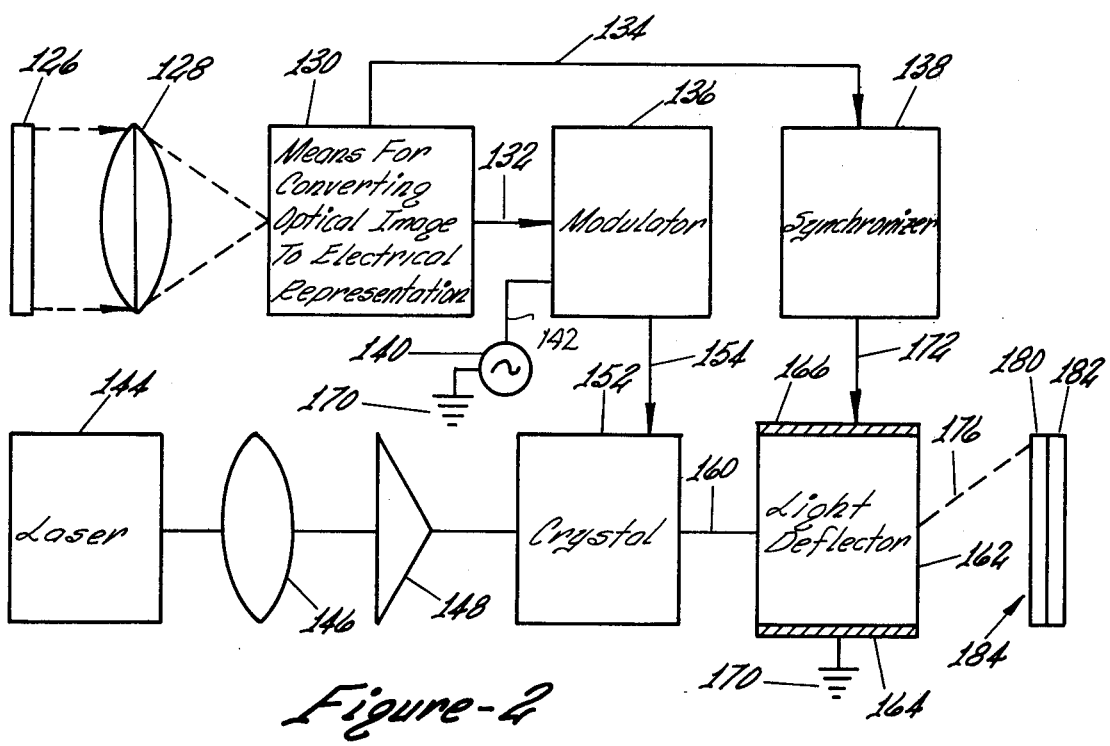
FIG. 2 is a block diagram, partially in schematic representation, of another embodiment of apparatus and a method for imaging a representation of a graphic indicia wherein a modulated scanned coherent beam of optical radiation forms an image on a chemically treated strip media adapted to be developed after imaging.
Figure 3:
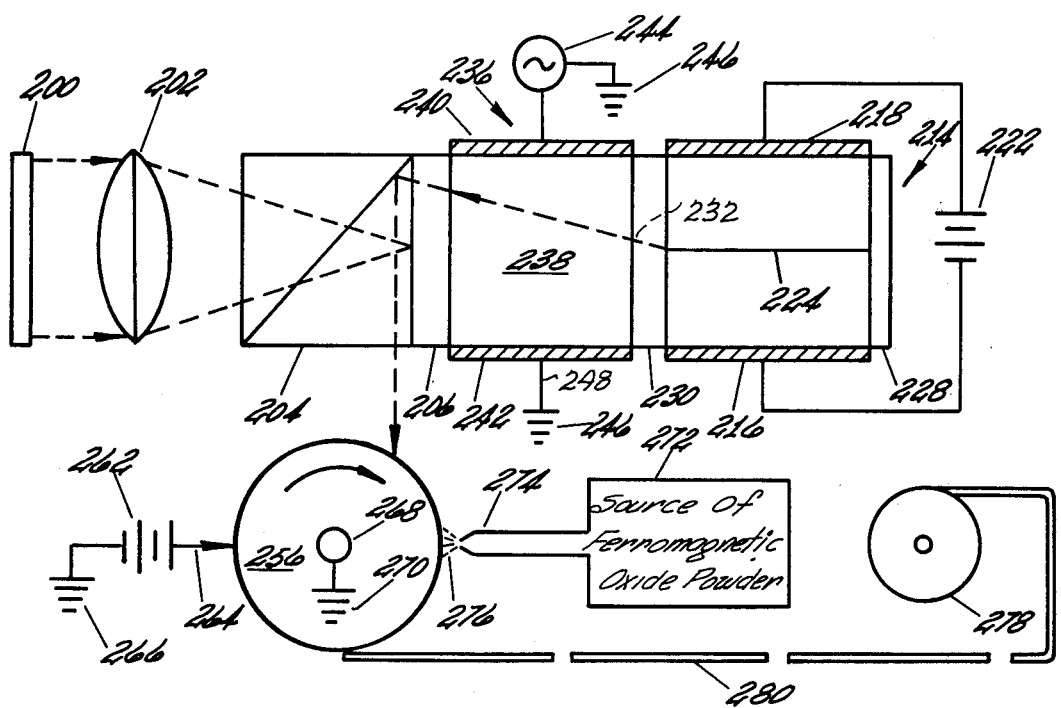
FIG. 3 is a block diagram, partially in schematic representation, of yet another embodiment of apparatus and a method for imaging a representation of a graphic indicia wherein a modulated scanned coherent beam of optical radiation is directed along a predetermined path to image the surface of a selenium forming an electrostatic image which is subsequently developed with black ferromagnetic oxide developing powder.

The ferromagnetic oxide powder may be held against the surface of the strip material 58 by a magnetic field or electric field shown in FIGS. 2 and 3. A means for establishing a magnetic field which attracts and holds the thin film of ferromagnetic oxide developing powder in communication with the surface is generally shown by arrow 96. In the embodiment of FIG. 1, the means for establishing the magnetic field includes a core 100, windings 102 and a voltage source 104 connected via leads 106 and 108 respectively to winding 102. Plenum plate 80 is positioned between core 100 and winding 102 and the uncoated surface of strip material 58.

Plenum plate 80 has a plurality of apertures 110 and forms one side a positive pressure chamber 112. The core 100 and winding 102 are located within the interior of chamber 112. A positive pressure source 114 is connected via conduct 116 to chamber 112.

The positive pressure source 114 applies a positive pressure, for example air, via conduct 116 to chamber 112. The positive pressure produces a thin fluid film which urges the uncoated surface of strip material 58 away from plenum plate 80. The thin film of fluid functions to insulate the strip material 58 from the plenum plate 80.

Thus, as the scanning modulated coherent beam scans in a scan pattern across the coated surface of strip material 58, the strip material is suspended on a cushion of air and the developing fluid is selectively held in communication against the outer surface of the strip material 58 by a magnetic field.

The coherent beam radiation is then modulated by the modulating means at selected energy levels at the wave-length of the coherent beam. The energy levels are capable of selectively thermally setting and bonding the developing powder on the outer surface of strip material 58 as the coherent beam impinges upon the developing powder. The coherent beam currently forms the image as the modulated coherent beam is scanned across the one surface in a controlled pattern and develop the so formed image by selectively thermally setting and bonding the developing powder to the one surface.

The developing powder which is not thermally bonded and set by the coherent beam is removed from the surface of the strip material 58. For example, the developing area 62 may be subjected to a negative pressure or vacuum to draw out the unused developing powder. An additional nozzle and source of negative pressure (not shown) may be utilized. Then methods for removing the unused developing powder from the surface of the strip material may be used provided that the image developed by the thermally set developing powder is not removed from the strip material 58.

By using the apparatus of FIG. 1, a novel and unique method for imaging a representation of graphic indicia is disclosed. The method includes the steps of: converting the graphic indicia into an electrical representation thereof; generating a coherent beam of optical radiation having a wavelength within a particular wave-length range; modulating the propagation of the coherent beam at a wavelength within the wavelength range in response to a modulation signal; scanning said modulated coherent beam across a surface in response to a scanning signal; generating a modulation signal and a scanning signal from the electrical representations; controlling the modulation and scanning of the coherent beam with said modulation signal and said scanning signal to modulate and scan said coherent beam in a controlled pattern forming an image on said surface representation of said graphic indicia; and developing said image on said surface.

The steps of developing the image may include the steps of: distributing a thin film of thermally settable and bondable developing fluid on the one surface of the strip material and controlling the energy level of the coherent beam with modulation signals concurrently forming an image as the modulated coherent beam is scanned across the one surface in a controlled pattern and developing the so formed image by selectively thermally setting and bonding the developing powder with the coherent beam to the one surface.

Referring now to FIG. 2, the imaging apparatus shown is adapted to image a chemically treated or coated sheet material to form latent image with a scanned modulated laser beam. Thereafter, the imaged sheet is developed either by known wet or dry developing processes.

In the embodiment of FIG. 2, the graphic indicia 126 to be reproduced or copy is imaged by an optical lens system 128 onto a means for converting and optical image to an electrical representation 130. The converting means 130 produces modulating signals which appear on output 132 and synchronizing control signal which appear on output 134 from the electrical representations.

The modulating signal or output 132 are applied as an input signal to a modulator 136 and the synchronizing control signals on output 134 are applied as an input signal to a synchronizer 138. In addition, modulator 136 may be connected to an oscillator 140 which is connected between common ground 170 by lead 142 to frequency modulate the output of modulator 136.

A laser source 144 produces a coherent beam of optical radiation which passes through a collimator 146 and a prism 148 onto a electro-optical crystal 152. Crystal 152 is responsive to the frequency modulated signal from modulation 136 which is applied to crystal 152 via lead 154. The modulation signals from modulator 136 provides an electric field across the crystal 152 which is frequency modulated at the frequency of the oscillator 140. By controlling the amplitude and frequency of the modulator 136, the electric field applied across the crystal 152 is modulated which in turn varies the indices of refraction with the crystal to modulate the coherent beam from the laser source 144.

In this manner, the output from the crystal 152 is a modulated coherent beam which has been modulated in accordance with intelligence derived from the electrical representation of the graphic indicia to be reproduced or copied.

The modulated coherent beam represented by line 160 is directed onto a light deflector 162. Light deflector 162 has a pair of deposited electrodes 164 and 166 on each surface thereof parallel to the modulated coherent beam 160. Electrode 164 is connected to a common ground 170 and electrode 166 is connected to the output of synchronizer 138 represented by lead 172. The synchronizing control signals from synchronizer 138 are applied via lead 172 to control light deflector 162 producing scanning of the modulated coherent beam 160 into a controlled scan pattern. The scanned modulated coherent beam, represented by dashed line 176, is directed onto one surface 180 of a sheet material 182 forming a coated sheet material, generally designated by arrow 184. The one surface 180 may be formed of any known chemical layers which is responsive to the coherent beam at the wavelength thereof to produce a latent image from the scan pattern.

The imaged coated sheet material 184 has a latent image formed on surface 180 which may chemically or thermally be developable. For example, microfilm copying apparatus utilizes thermal development of chemically treated strip material to develop latent image optically projected thereon from a photographic image on microfilm.

FIG. 3 is yet another embodiment for practicing the method and apparatus of this invention. Graphic inidica 200 is projected by an optical lens system depicted by optical lens 202 through a beam splitter 204 on to the surface of a polychromatic glass 201.

An injection laser 214 comprising a P-N junction laser 224 has a pair of parallel spaced electrodes 216 and 218 deposited thereon on the outer surfaces thereof. A source of direct current voltage 218 is electrically connected to the electrodes 216 and 218 of sufficient magnitude to establish a voltage drop across the P-N junction 224 to cause a population inversion thereacross to produce the coherent radiation. The ends of the injection laser 214 are opposite parallel surfaces 228 and 230 which form a cavity resonant. The opposed parallel surface 228 and 230 forming the cavity resonator may be silvered or form a reflector surface containing the radiation with the resonant cavity. By making the surface 230 more transmissive, the coherent radiation is emitted from surface 230 as a coherent beam of radiation, generally shown by dashed line 232.

The coherent beam 232 is directed onto a laser scanner 238. Laser scanner 236 may be a electro-optic crystal 238 having parallel longitudinal surfaces which are provided with electrode 240 and 242. Electrode 240 may be connected to an alternating voltage source 244 while electrode 242 is connected to a common ground 246 via lead 248, the alternating voltage source 244 establishes an electric field across the crystal 238 which varies the index of refraction thereof resulting in the effective scanning of the laser beam 232 as an output therefrom.

The scanned coherent beam which appears as an output from light scanner 236 is applied to the other side of the polychromic glass 206. Polychromic glass 206 modulates the intensity of the scanned coherent beam in response to the optical image impinges onto the parallel opposite surface off the polychromic glass 206. In this manner, a modulated scanned laser beam emanates from glass 206.

The beam splitter 204 deflects the modulated, scanned laser beam onto a surface from which an image can be developed.

In the embodiment of FIG. 3, the surface is the peripheral outer surface of a rotatable drum 256. The drum surface is formed of a material, such as selenium which is capable of being changed from an electric source 262 via lead 264 which selectively charges the surface of the drum 256. The source 262 is likewise electrically connected to common ground 266.

The drum 256 is rotatably mounted on a bearing 268 which together with the support frame forms a conducting path 270 which is in turn part of the common ground 266. In the embodiment of FIG. 3, the drum is rotated counter clockwise as the modulated laser beam is scanned therefrom. As the modulated scanned laser beam impinges on the surface of the drum 256, the charge thereon is varied by the actinic energy of the laser beam forming an electrical representation of the image on the drum surface. The pattern of electrical charge level on the surface of the drum is representative of the graphic indicia.

The electrical charge patten on the surface of drum 256 is developed by a thermally settable ferromagnetic oxide powder from a source 272. The developing powder is dispersed through a nozzle 272 which forms a substantially uniform spray 276. The spray 276 is directed toward and impinges upon the surface of drum 276. The powder adheres to that portion of the drum surface having the differential electrostatic change pattern. The powder is held on the surface drum 256 by the electrostatic charge and is transported by the drum into transferable contact with a strip member 280 severed from a stock roll 278. The strip material having the image thereon is passed or transported through a bonding station (not shown) whereon the developed imaged is thermally bonded and fused to the strip material 280.

Other developing means using electrostatic or other similar processes may be used to develop an electrostatic image with a ferromagnetic oxide powder. Some of the developing means form an electrostatic image directly on the strip material surface and utilize a coating roller which coats a thin film of developing powder directly onto the electrostatic image to form developed image. The so developed image is then bonded onto the sheet.

In the present invention, the embodiments illustrated herein disclose an application wherein the means for converting an optical image to an electrical representation (collectively referred to as a transmitting means) is positioned adjacent to or integral with the developing means utilizing the modulated, scanned laser beam (collectively referred to as the receiving means). However, applications wherein the two components, the transmitting means and the receiving means, are separate, such as for example, a facsimile transmission system, may utilize the teachings of this invention. Transmission of electrical signals between the two components may be via telephone line, microwave system or the like.

Also, other application capable of utilizing the teachings of this invention are systems for producing printing plates wherein the scanning, modulated laser beam actinic energy selectively images and develops the surface of the printing plate. The image can then be reproduced using fluids such as ink, etc.

As improved coherent beam sources are developed, the energy levels and wavelengths range can be precisely controlled. Similarly, improved apparatus and means for modulating and scanning coherent beams of optical radiation will broaden the types of applications and uses of the present invention.

What is claimed is:

1. Apparatus for imaging graphic indicia comprising means for converting the graphic indicia into electrical representations thereof;

a source of a coherent beam of optical radiation having a wavelength within a particular wavelength range;

means disposed relative to the coherent beam and responsive to a modulating signal for modulating the propagation of the coherent beam at the particular wavelength within the wavelength range;

means responsive to a scanning signal for scanning said modulated coherent beam across a surface;

control means operatively coupled to said converting means for generating the modulation signal and the scanning signal from the electrical representations, said control means including means for controllably gating the modulation signal to the modulating means and the scanning signal to the scanning means to scan the coherent beam in a controlled pattern on the surface and to modulate the scanned coherent beam imaging on the surface a representation of graphic indicia;

means for selectively adhering a thin film of developing fluid on the imaged surface forming a developed image of said graphic indicia; and means for establishing a gradient field which attracts and holds said thin film of developing fluid in communication with said surface as the modulated coherent beam is scanned thereacross.

2. The apparatus of claim 1 wherein said developing fluid is a thermally bondable developing fluid and wherein said developing fluid adhering means comprises means for distributing a relatively thin film of said developing fluid on said surface.

3. The apparatus of claim 2 wherein the surface is one surface of a strip member, the developing fluid is a thermally settable and bondable developing powder capable of being thermally bonded to the one surface by radiation at selected energy level and having a wavelength within the particular wavelength range and said modulation means is responsive to th electrical representations for modulating propagation of the coherent beam at radiation energy level within a range of selected energy levels at said wavelength, said selected energy levels of coherent beam radiation being at radiation energy levels capable of selectively thermally setting and binding said developing powder to the one surface as the coherent beam is scanned across said one surface in the controlled pattern to concurrently form said image on the surface and develop the formed image by selectively thermally setting and bonding said developing powder to said one surface as the coherent beam of radiation is scanned thereacross.

4. The appartus of claim 3 wherein said developing powder is a ferromagnetic oxide powder.

5. The apparatus of claim 2 wherein said distributing means comprises a source of ferromagnetic oxide powder;

a pressurized developing powder distributor; and means operatively coupling said source of ferromagnetic oxide powder and said pressurized developing powder distributor; and means for uniformly distributing a thin film of developing powder on said surface.

6. The apparatus of claim 5 where said uniformly distributing means includes a nozzle.

7. The apparatus of claim 1 wherein the gradient field means is a means for establishing a magnetic field.

8. The apparatus of claim 6 further comprising a plenum formed of a relatively flat planar surface and adapted to have said strip member transported thereacross, said plenum having a plurality of apertures formed therethrough; and a source of positive pressure; and means operatively connected between said plenum and said positive pressure source to apply the positive pressure from the source to the plenum forcing the positive pressure through said apertures into contact with said strip member forming a thin fluid film between the strip member and the planar surface of the plenum.

9. The apparatus of claim 1 wherein the gradient field means is a means for establishing an electrical field.

10. A method for imaging a representation of graphic indicia comprising the steps of converting the graphic indicia into an electrical representation thereof;

generating a coherent beam of optical radiation having a wavelength within a particular wavelength range;

modulating the propagation of the coherent beam at a wavelength within the wavelength range in response to a modulation signal;

scanning said modulated coherent beam across a surface in response to a scanning signal;

generating a modulation signal and a scanning signal from the electrical representations;

controlling the modulation and scanning of the coherent beam with said modulation signal and said scanning signal to modulate and scan said coherent beam in a controlled pattern forming an image on said surface representative of said graphic indicia;

distributing a thin film of thermally settable and bondable developing fluid on the surface; and controlling the energy level of the coherent beam with said modulation signals concurrently forming an image as the modulated coherent beam is scanned across the surface in a controlled pattern and developing the so formed image by selectively thermally setting and bonding the developing fluid with the coherent beam to the surface.

11. The method of claim 10 wherein said thin film of developing fluid is a fluid having a magnetic material therein.

12. The method of claim 10 wherein said thin film of developing fluid is a ferromagnetic oxide powder.

13. Apparatus for transmitting and receiving graphic indicia comprising means for converting the graphic indicia into electrical representation thereof;

transmitting means operatively connected to the converting means for transmitting the electrical representations received therefrom;

receiving means comprising a source of coherent beams of optical radiation having a wavelength within a particular wavelength range;

means disposed relative to the coherent beam and responsive to a modulation signal for modulating the propagation of the coherent beam at the particular wavelength within the wavelength range;

means responsive to a scanning signal for scanning the modulated coherent beam across a surface;

control means operatively coupled to said converting means for generating the modulation signal and the scanning signal from the transmitted electrical representations, said control means including means for controllably gating the modulation signal to the modulating means and the scanning signal to the scanning means to scan the coherent beam in a controlled pattern on the surface and to modulate the scanned coherent beam imaging on the surface a representation of the graphic image;

image developing means for selectively adhering a thin film of developing fluid on the imaged surface forming a developed image of the graphic indicia; and means for establishing a gradient field which attracts and holds said thin film of developing fluid in communication with said one surface as the modulated coherent beam is scanned thereacross.

14. A method for recording information on a recording surface comprising producing electrical signals which are an electrical representation of information to be recorded on a recording surface;

generating a coherent beam of optical radiation having a wavelength within a particular wavelength range;

modulating the propagation of the coherent beam at a wavelength within the wavelength range in response to a modulation signal;

scanning said modulated coherent beam across the recording surface in response to a scanning signal;

generating a modulation signal and scanning signal;

controlling the modulation and scanning of the coherent beam relative to the recording surface with said modulation signal and scanning signal to modulate and sca said coherent beam in a controlled pattern forming an image representative of the information to be recorded on the recording surface;

distributing a thin film of thermally settable and bondable developing fluid on the recording surface; and controlling the energy level of the coherent beam with said modulation signal concurrently forming an image as the modulated coherent beam is scanned across the recording surface in a controlled pattern and developing the so formed image by selectively thermally setting and bonding the developing fluid with the coherent beam to the recording surface.

* * * * *